United States Patent [19]
Sheperd

[11] 3,735,840
[45] May 29, 1973

[54] SPRING OPERATED ACTUATOR FOR OPENING AND CLOSING DOORS, OR THE LIKE

[75] Inventor: Willard W. Sheperd, Whittier, Calif.

[73] Assignee: Shepherd Machinery Co., Los Angeles, Calif.

[22] Filed: Feb. 7, 1972

[21] Appl. No.: 223,882

[52] U.S. Cl. ................ 185/39, 49/379, 185/43, 192/48.92
[51] Int. Cl. .................... E05f 1/14, F03g 1/08
[58] Field of Search ............... 185/10, 13, 39, 43; 49/379; 192/48.92

[56] References Cited
UNITED STATES PATENTS

| 544,350 | 8/1895 | Cross | 185/10 |
| 851,836 | 4/1907 | Ring | 185/10 |
| 1,062,085 | 5/1913 | Desbecker | 49/379 |
| 1,614,789 | 1/1927 | Green | 49/379 X |
| 2,910,290 | 10/1959 | Buchanan | 49/379 X |

Primary Examiner—Allan D. Herrmann
Attorney—Ford W. Harris, Jr., Warren L. Kern, Donald C. Russell et al.

[57] ABSTRACT

A remotely controlled, spring operated actuator for opening and closing a door, or the like. The actuator spring is wound by manual opening and closing of the door. Remote controls selectively activate the actuator in directions to open and close the door.

7 Claims, 8 Drawing Figures

STATIC, SOLENOIDS OFF
AND CLUTCHES AND PAWLS ENGAGED

DOOR MANUALLY OPENED
SPRING WINDS

DOOR MANUALLY CLOSED
SPRING WINDS

SPRING OPENS DOOR
SPRING UNWINDS

SPRING CLOSES DOOR
SPRING UNWINDS

SPRING OPERATED ACTUATOR FOR OPENING AND CLOSING DOORS, OR THE LIKE

BACKGROUND OF INVENTION

The present invention relates in general to a spring operated actuator and, more particularly, to an actuator of this type for displacing a bidirectionally movable member selectively in opposite directions.

Since the invention is particularly applicable to and was originally embodied in a remotely controlled, spring operated actuator for opening and closing a door, it will be considered in such connection herein for convenience, with the understanding that the invention may be utilized to displace other bidirectionally movable members in opposite directions selectively.

SUMMARY AND OBJECTS OF INVENTION

A primary object of the invention is to provide a spring operated actuator for a bidirectionally movable member which is energized as the result of movement of the member in opposite directions by external forces, and which can be activated selectively from a remote station to cause stored energy to displace the member in one direction or the other.

More particularly, the invention may be summarized as including, and an important object is to provide a spring operated actuator which includes: spring means; means responsive to movement of the movable member in one direction by an external force for stressing the spring means; means responsive to movement of the member in the opposite direction by an external force for stressing the spring means; means for applying energy stored in the spring means to the member to move it in said one direction; and means for applying energy stored in the spring means to the member to move it in said opposite direction. A related object is to provide remotely located manual control means for selectively activating the energy applying means.

The invention may be further summarized as including, and another important object is to provide a spring operated actuator which includes: a shaft; spring means; means responsive to rotation of the shaft in one direction by an external force for stressing the spring means; means responsive to rotation of the shaft in the opposite direction by an external force for stressing the spring means; means for applying energy stored in the spring means to the shaft to rotate the shaft in said one direction; and means for applying energy stored in the spring means to the shaft to rotate the shaft in the opposite direction. Again, a related object is to provide remotely located, manual control means for selectively activating the energy applying means.

A further object of the invention is to provide a spring operated actuator which includes: a shaft; a spiral spring encompassing the shaft; two members rotatably mounted on the shaft and respectively connected to the ends of the spring; means for selectively connecting the members to the shaft; and means for selectively preventing rotation of the members.

The invention may be still further summarized as including, and yet another object of the invention is to provide a spring operated actuator which includes: a housing; a shaft rotatable in the housing; a spiral spring in the housing and encompassing the shaft; circumferentially oppositely oriented, first and second ratchets in the housing and rotatably mounted in the shaft and respectively connected to the ends of the spring; first and second pawls carried by the housing and respectively engaging the first and second ratchets; circumferentially oppositely oriented, first and second clutches keyed or splined to the shaft and respectively engaging complementary portions of the first and second ratchets; control means for disengaging the first pawl from the first ratchet and for simultaneously disengaging the second clutch from the second ratchet; and control means for disengaging the second pawl from the second ratchet and for simultaneously disengaging the first clutch from the first ratchet.

The foregoing objects, advantages, features and results of the present invention, together with various other objects, advantages, features and results thereof which will be evident to those skilled in the art to which the invention relates in the light of this disclosure, may be achieved with the exemplary embodiment of the invention illustrated in the accompanying drawings and described in detail hereinafter.

DETAILED DESCRIPTION OF EXEMPLARY EMBODIMENT OF INVENTION

Figure 1:
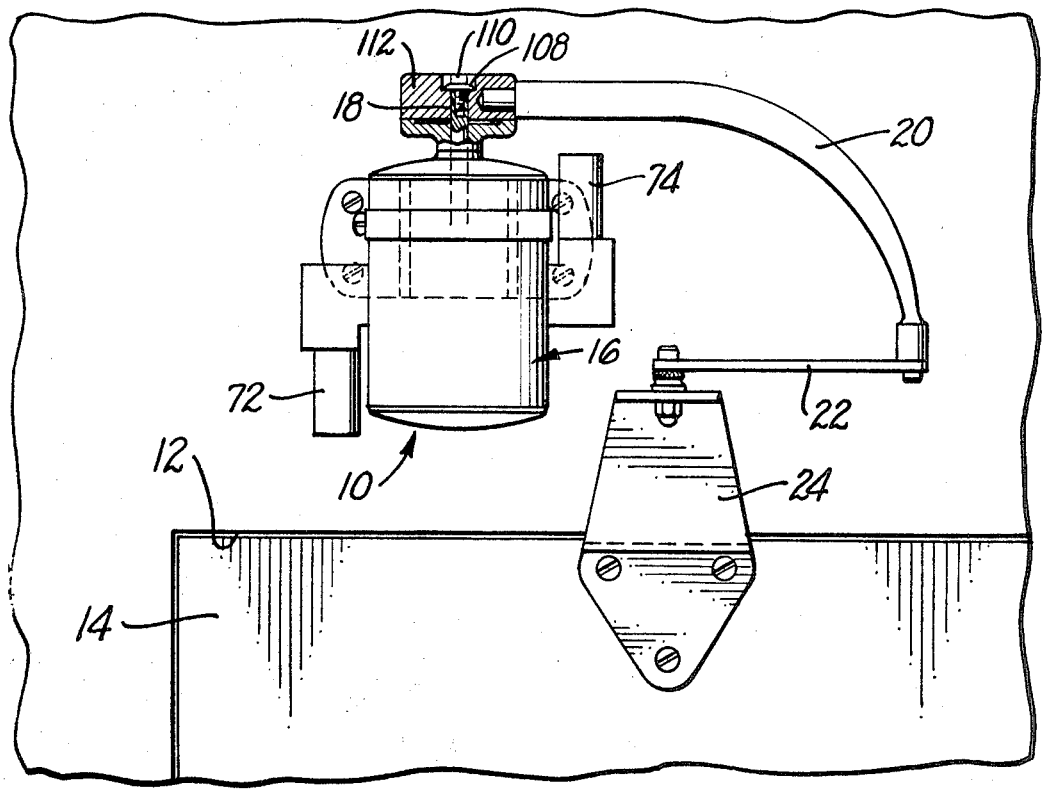
FIG. 1 is an elevational view illustrating the spring operated actuator of the invention as applied to a swinging door.

Referring initially to FIG. 1 of the drawings, the spring operated actuator of the invention is designated generally by the numeral 10 and is shown mounted above a doorway 12 equipped with a swinging door 14, the door being hinged along its left vertical edge, as viewed in FIG. 1.

The actuator 10 includes a housing 16 in which is journalled a central vertical shaft 18. Suitably fixed on the upper end of the shaft 18 is an arm 20 which extends downwardly towards the upper edge of the door 14 and which has a link 22 connected to its lower end for pivotal movement about a vertical axis. The other end of the link 22 is connected for pivotal movement about a vertical axis to a bracket 24 suitably secured to the door 14.

First and second ratchets 26 and 28 are rotatably mounted on the shaft 18 intermediate its upper and lower ends, these ratchets being circumferentially oriented in opposite directions. In other words, the first and second ratchets 26 and 28 have peripheral ratchet teeth 30 and 32 which face circumferentially in opposite directions.

Figure 2:
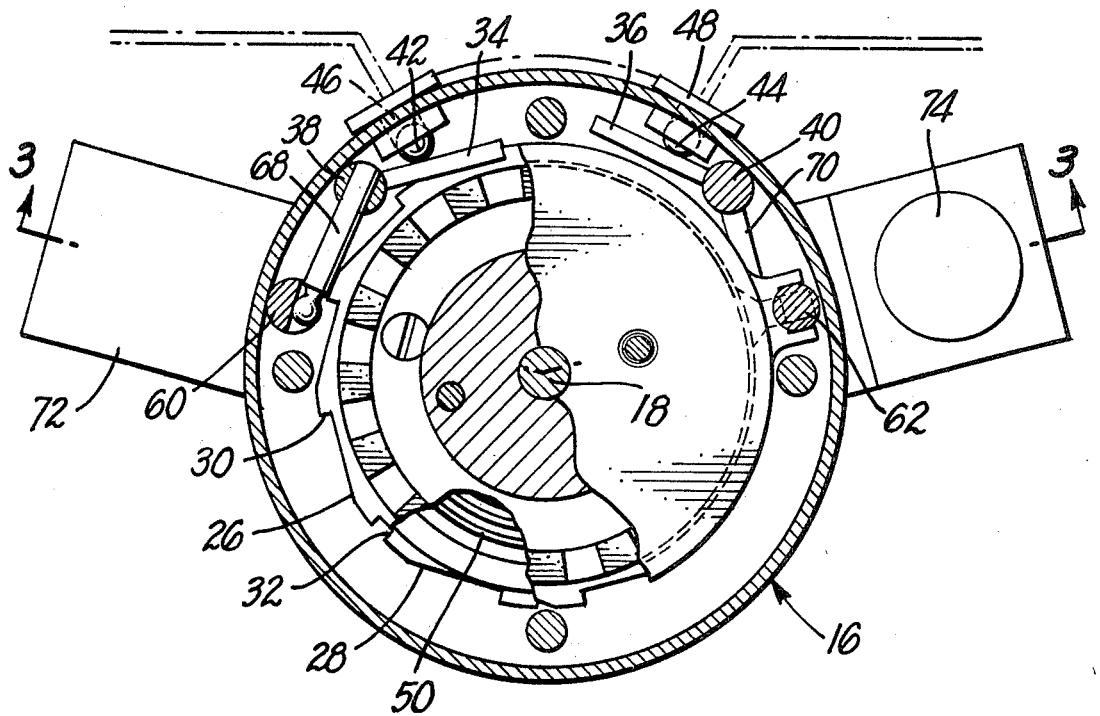
FIG. 2 is an enlarged horizontal sectional view through the spring operated actuator and is taken as indicated by the irregular arrowed line 2—2 of FIG. 3.

As best shown in FIG. 2, circumferentially oppositely oriented first and second pawls 34 and 36 are respectively engageable with the circumferentially oppositely oriented teeth 30 and 32 of the first and second ratchets 26 and 28. The first and second pawls 34 and 36 are carried by and extend radially from first and second vertical shafts 38 and 40 which are journalled in the housing 16 at their upper and lower ends. Balls 42 and 44 biased by springs 46 and 48 are seated against the respective pawls 34 and 36 and bias them into engagement with their respective ratchets 26 and 28.

The first and second ratchets 26 and 28 serve as anchors for a spring means comprising a spiral spring 50 encircling the central shaft 18 and having its ends secured to the respective ratchets. More particularly, the inner end 52 of the spiral spring 50 is disposed in a vertical slot in a hub 54 of the first ratchet 26, and the outer end 56 of the spiral spring is disposed in a vertical slot in an annular skirt 58 of the second ratchet 28. As will be apparent, the spiral spring 50 is wound to store energy therein in response to rotation of the first ratchet 26 in one direction, or in response to rotation of the second ratchet 28 in the opposite direction. This will be discussed in more detail hereinafter in explaining the operation of the actuator 10.

The first pawl 34, of course, permits rotation of the first ratchet 26 in one direction, and the second pawl 36 similarly permits rotation of the second ratchet 28 in the opposite direction. In order to permit reversing of these directions of rotation of the first and second ratchets 26 and 28, means are provided for disengaging the first and second pawls from their respective ratchets. More particularly, vertically movable in the housing 16 are first and second plungers 60 and 62 respectively provided with cams 64 and 66, these cams being formed by notches in the respective plungers. Engageable with the first and second cams 64 and 66 are arms 68 and 70 respectively extending radially from and secured to the first and second shafts 38 and 40. As will be apparent, when the plunger 60 is displaced downwardly, the cam 64 acts on the arm 68 to pivot the shaft 38 in a direction to disengage the pawl 34 from its ratchet 26. Similarly, if the plunger 62 is displaced upwardly, the cam 66 acts on the arm 70 to pivot the shaft 40 in a direction to disengage the pawl 36 from its ratchet 28, this condition being shown in FIG. 2 of the drawings.

The first and second plungers 60 and 62 are actuated by first and second solenoids 72 and 74 mounted on the housing 16. More particularly, the first and second plungers 60 and 62 carry outwardly extending arms 76 and 78 which are pivotally connected to the armatures of the respective first and second solenoids 72 and 74. The latter are oppositely oriented in the vertical direction so that energization of the first solenoid 72 displaces the first plunger 60 downwardly to disengage the first pawl 34 from the first ratchet 26. Similarly, energization of the second solenoid 74 displaces the second plunger 62 upwardly to disengage the second pawl 36 from the second ratchet 28.

Respectively engageable with the first and second ratchets 26 and 28 are circumferentially oppositely oriented, first and second jaw clutches 80 and 82 keyed to the central shaft 18, but movable axially thereof. This is shown as accomplished by ball splines 81 and 83. More particularly, the first and second clutches 80 and 82 are provided with circumferentially oppositely oriented teeth 84 and 86 respectively engageable with circumferentially oppositely oriented, complementary teeth 88 and 90 on the first and second ratchets 26 and 28. The first and second clutches 80 and 82 are respectively biased into engagement with the first and second ratchets 26 and 28 by springs 92 and 94 encircling clutch guides 96 and 98.

Figure 3:
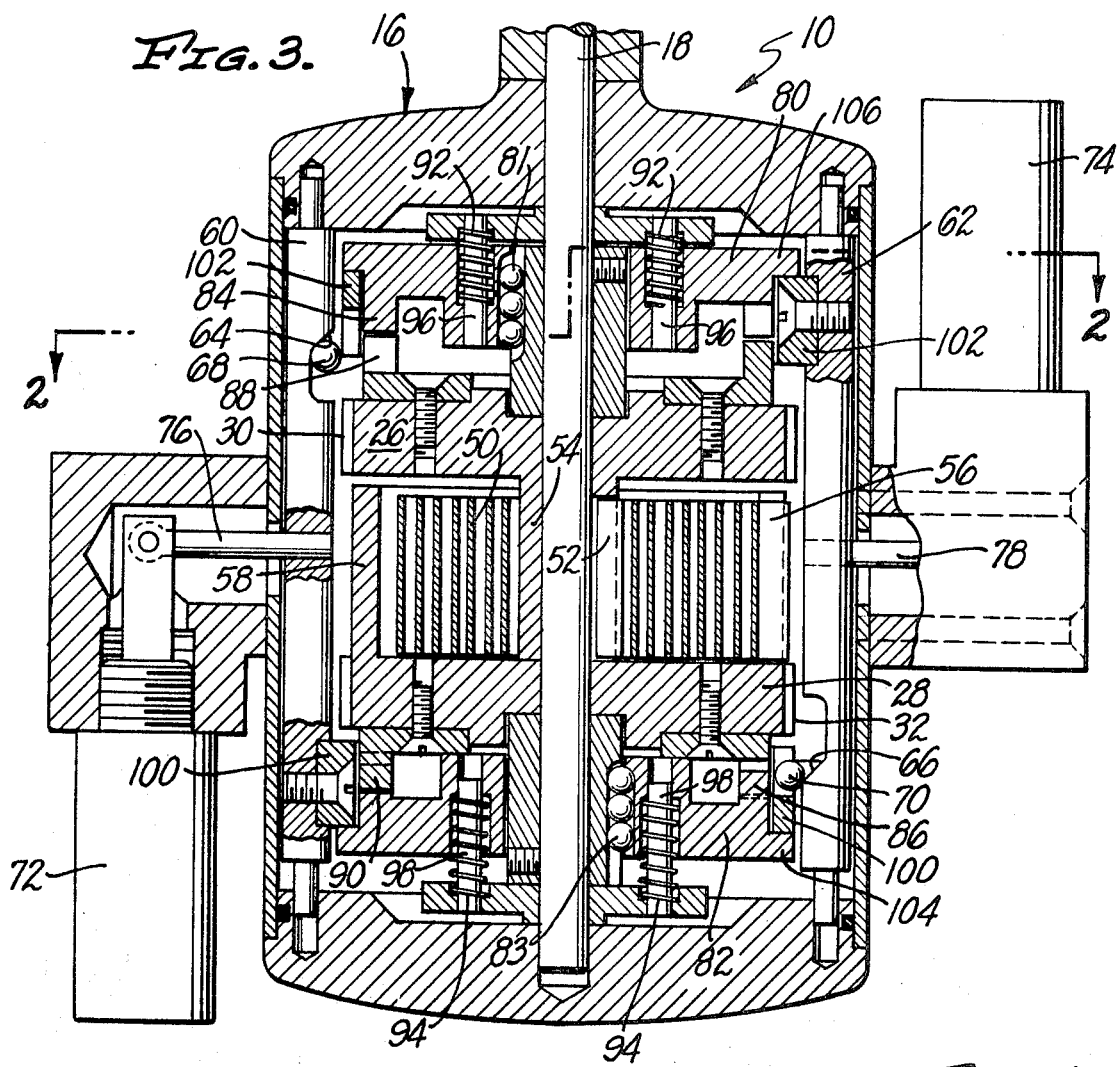
FIG. 3 is a vertical sectional view of the actuator and is taken as indicated by the arrowed line 3—3 of FIG. 2.

The plungers 60 and 62 respectively carry shifting collars 100 and 102 which encompass and engage annular flanges 104 and 106 on the respective clutches 82 and 80. As will be apparent from FIG. 3 of the drawings, when the first solenoid 72 is energized to displace the first plunger 60 downwardly, this plunger not only disengages the first pawl 34 from the first ratchet 26, but disengages the second clutch 82 from the second ratchet 28. Similarly, when the second solenoid 74 is energized to displace the second plunger 62 upwardly, this plunger not only disengages the second pawl 36 from the second ratchet 28, but disengages the first clutch 80 from the first ratchet 26. The significance of this interrelationship will become apparent from the following description of the operation of the actuator 10.

EXPLANATION OF OPERATION OF EXEMPLARY EMBODIMENT OF INVENTION

The operation of the invention can best be explained in connection with the semidiagrammatic views of FIGS. 4 to 8, which will now be considered in numerical order.

Figure 4:
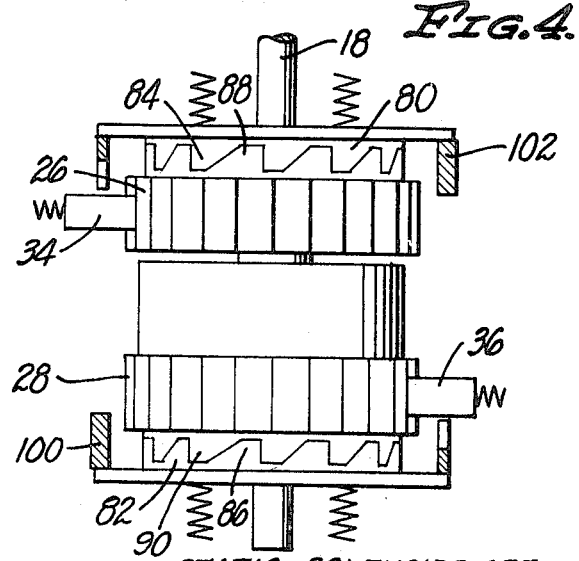
FIG. 4 is a semidiagrammatic view of the spring operated actuator of the invention, showing the actuator in a static condition.

First of all, FIG. 4 shows the actuator 10 in a static condition, with the door 14 in any desired position. Under such conditions, the solenoids 72 and 74 are de-energized and the pawls 34 and 36 and the clutches 80 and 82 are engaged with the ratchets 26 and 28.

Figure 5:
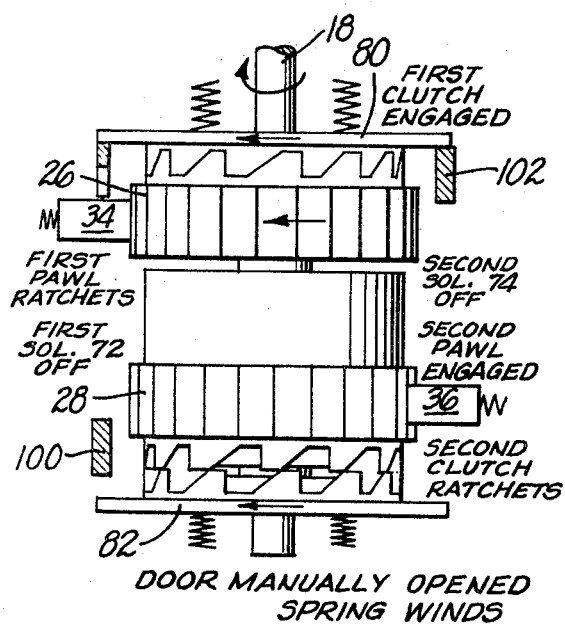
FIG. 5 is a view similar to FIG. 4, but showing the actuator when the door is being opened manually to wind the actuator spring.
Figure 6:
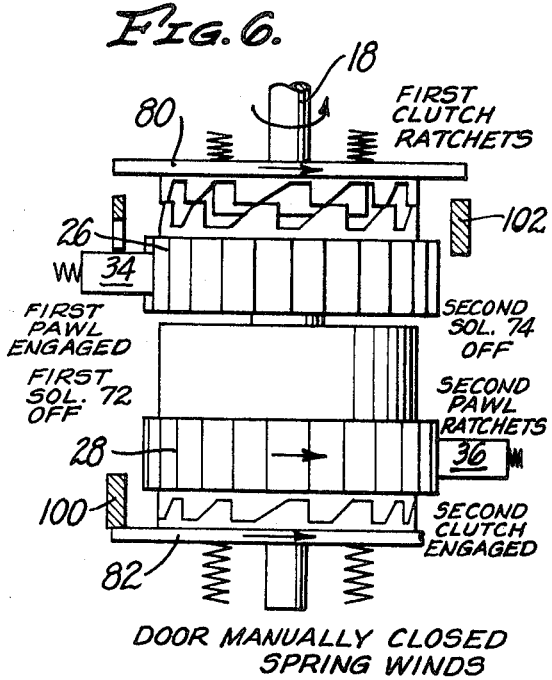
FIG. 6 is also a view similar to FIG. 4, but showing the actuator when the door is being closed manually to wind the actuator spring.

FIGS. 5 and 6 illustrate the operation of the actuator 10 when the door 14 is being manually opened and closed, respectively. The legends on FIGS. 5 and 6 indicate the positions of the various parts, and the motions of the moving parts are designated by corresponding arrows. In both cases, the spiral spring 50 is being wound. To prevent overwinding, the arm 20 is connected to the shaft 18 frictionally through a Belleville washer 108 secured to the shaft by a screw 110 and seated against the inner end 112 of the arm. When the spring 50 is fully wound, the washer 108 slips during subsequent manual door openings and closings.

Figure 7:
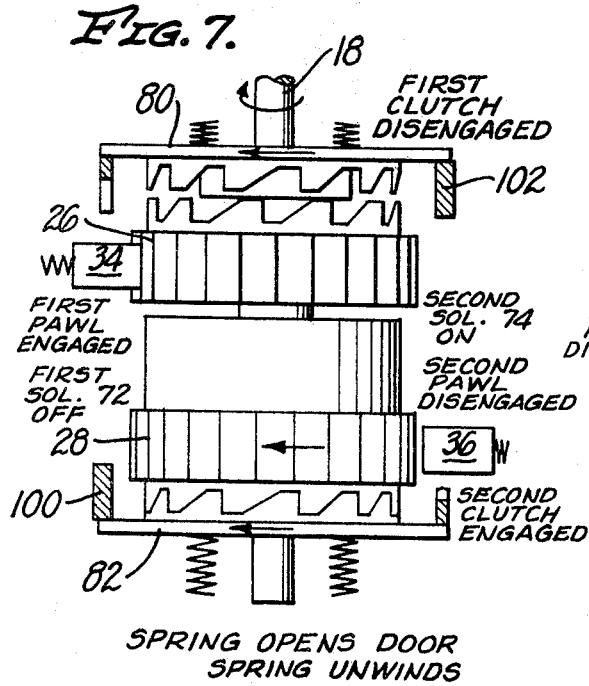
FIG. 7 is another view similar to FIG. 4, but showing the actuator in operation to open the door, the spring unwinding as this occurs.

Turning to FIG. 7 of the drawing, when it is desired to utilize the actuator 10 to open the door 14, the second solenoid 74 is energized, as by means of a switch, not shown, at a remote location. When this is done, the actuator 10 opens the door, the spring 50 unwinding as this occurs. The positions of the various parts are indicated by the legends in FIG. 7, and the motions of the moving parts are indicated by the corresponding arrows.

Figure 8:
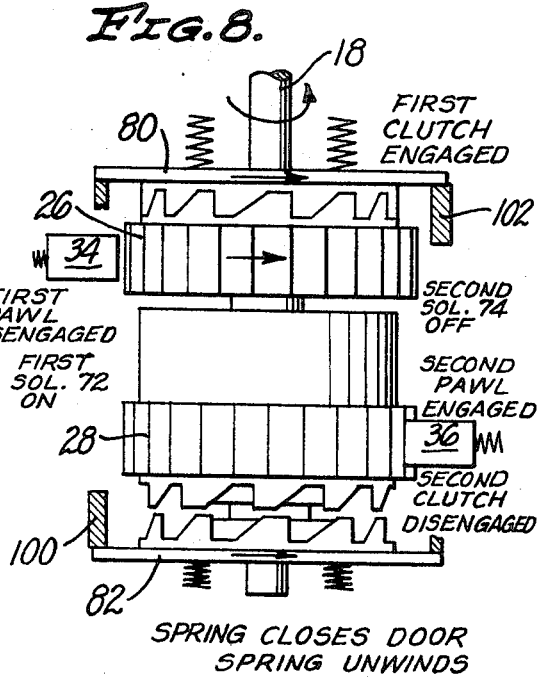
FIG. 8 is yet another view similar to FIG. 4, but showing the actuator in operation to close the door, the spring again unwinding as this occurs.

Similarly, when it is desired to close the door 14 with the actuator 10, the first solenoid 72 in energized, again as by means of a remotely located switch, not shown. The legends in FIG. 8 show the positions of the various parts, and the arrows again show the directions of movement of the moving parts.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

I claim as my invention:

1. In a spring operated actuator for a bidirectionally movable member, the combination of:
   a. spring means;
   b. means responsive to movement of the member in one direction by an external force for stressing said spring means;
   c. means responsive to movement of the member in the opposite direction by an external force for stressins said spring means;
   d. means for applying energy stored in said spring means to the member to move it in said one direction; and
   e. means for applying energy stored in said spring means to the member to move it in said opposite direction.

2. A spring operated actuator as defined in claim 1 including manual control means for selectively activating said energy applying means.

3. In a spring operated actuator, the combination of:
   a. a shaft;
   b. spring means;
   c. means responsive to rotation of said shaft in one direction by an external force for stressing said spring means;
   d. means responsive to rotation of said shaft in the opposite direction by an external force for stressing said spring means;
   e. means for applying energy stored in said spring means to said shaft to rotate said shaft in said one direction; and
   f. means for applying energy stored in said spring means to said shaft to rotate said shaft in said opposite direction.

4. A spring operated actuator as defined in claim 3 including manual control means for selectively activating said energy applying means.

5. In a spring operated actuator, the combination of:
   a. a shaft;
   b. a spiral spring encompassing said shaft;
   c. two members rotatably mounted on said shaft and respectively connected to the ends of said spring;
   d. means for selectively connecting said members to said shaft; and
   e. means for selectively preventing rotation of said members.

6. In a spring operated actuator, the combination of:
   a. a housing;
   b. a shaft rotatable in said housing;
   c. a spiral spring encompassing said shaft;
   d. circumferentially oppositely oriented, first and second ratchets rotatably mounted on said shaft and respectively connected to the ends of said spring;
   e. first and second pawls on said housing and respectively engaging said first and second ratchets;
   f. circumferentially oppositely oriented, first and second clutches keyed to said shaft and respectively engaging complementary portions of said first and second ratchets;
   g. control means for disengaging said first pawl from said first ratchet and for simultaneously disengaging said second clutch from said second ratchet; and
   h. control means for disengaging said second pawl from said second ratchet and for simultaneously disengaging said first clutch from said first ratchet.

7. A spring operated actuator according to claim 6 wherein said control means respectively include solenoids one connected to said first pawl and said second clutch and the other connected to said second pawl and said first clutch.

* * * * *